Feb. 14, 1956  R. G. HALLOCK ET AL  2,734,464
METHOD AND MEANS FOR ROLLING PIE DOUGH
Filed April 15, 1953

INVENTORS.
Ruth G. Hallock.
BY John H. Hallock.
Wood, Herron & Evans
ATTORNEYS.

United States Patent Office 2,734,464
Patented Feb. 14, 1956

2,734,464

METHOD AND MEANS FOR ROLLING PIE DOUGH

Ruth G. Hallock and John H. Hallock, Glendale, Ohio

Application April 15, 1953, Serial No. 348,899

4 Claims. (Cl. 107—50)

This invention relates to pie making, and is directed in particular to a method and means by which the lower crust of a pie or pie shell may be formed directly in the pan in which it is to be baked.

The method and means of this invention may be utilized with any of the conventional, circular pie pans having a flat bottom and an outwardly flared wall. In practicing the invention, a lump of mixed pie dough of appropriate size to make a shell or lower crust is placed in the center of a pie pan. The lump of pie dough is rolled out in the pan by means of a novel roller which is of a shape to conform generally to the curvature of the flared wall of the pan. Rolling is begun at the center of the pan and the dough worked outwardly symmetrically toward the pan wall, and up the flared wall to the rim of the pan. Excess pie dough may be trimmed at the rim in the usual manner, if necessary. The shape of the roller is the thing which makes it possible to form a pie shell in this fashion. The roller may be from three to five inches long. Its shape may be described geometrically as an elongated ellipsoid of revolution. The important consideration is, however, that it conforms generally to the curvature of the wall of the pan in which the dough is being formed.

The invention saves considerable time and muss in the preparation of a pie. More important, however, the present method results in lighter and flakier pie crusts than are obtainable by conventional rolling. In preparing a pie crust in the usual way, that is by means of an ordinary cylindrical rolling pin and board, a substantial amount of rolling or working is required in order to obtain a sheet of pie dough which is sufficiently resistant to tearing to permit it to be lifted from the board and be placed in a pan. A well rolled sheet of raw pie dough, although it may be smooth and uniform in appearance, is not the criterion in obtaining a light, flaky pie shell. The objective of rolling is to form or shape the pie dough. Rolling pie dough in excess of that amount only serves to toughen it. We have found that forming pie dough right in the pan in which it is to be baked does not require the amount of rolling that tends to toughen the dough and thus better crusts are obtained.

The invention has particular utility in making pie crusts or shells from prepared pie mixtures, these mixtures requiring only the addition of water to complete their preparation. It is well recognized that the water which is added should be kept at a minimum, otherwise the crust becomes hard and tough, losing the flakiness which is desired. It is difficult however to properly shape prepared dough mixtures using a conventional rolling pin unless more water than is recommended, or is actually needed for baking, is added. The quantity of water to give the mixture the plasticity needed to permit a lump of the dough to be rolled into a thin sheet strong enough to be lifted and handled safely is detrimental to quality. By contrast, a comparative dry mix may be employed in the preparation of a crust in accordance with the present invention.

The objective of the invention, therefore, is two-fold; to provide a method and means of preparing a pie shell rapidly and without muss, and to provide a method and means which results in a better, lighter pie shell.

Other objectives and advantages of the invention will be apparent from the following detailed description of the drawings in which.

Figures 2, 3:
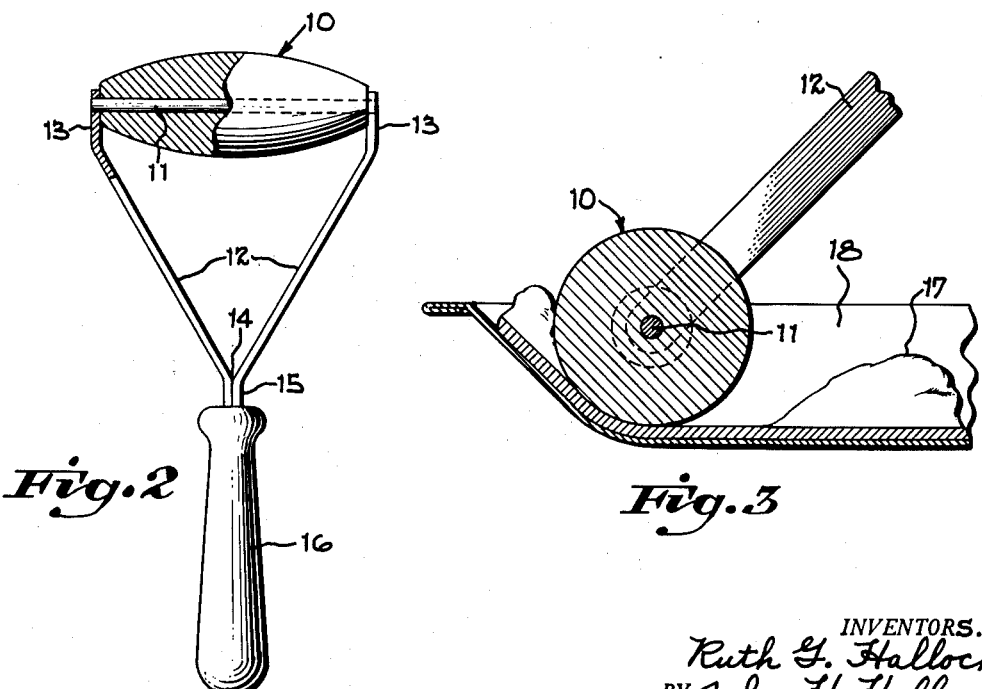
Figure 2 is an elevational view of the roller, shown partly in section, to illustrate a method of mounting the roller.
Figure 3 is a fragmentary cross sectional view further illustrating the method and means of the invention.

The roller, which is indicated at 10, may be made of wood, plastic or any other appropriate material. The preferred shape of the roller is that of an elongated ellipsoid of revolution, the longitudinal curvature of which corresponds generally to the curvature of the wall of a conventional pie pan. It is not necessary that the curvature of the roller conform exactly to the wall. It is found that one roller may be utilized with pans of various sizes and shapes providing there is not too great a difference between the curvature of the roller and pan wall. The roller is journalled for rotation about its longitudinal axis. In the instance shown, a journal pin 11 is provided which is mounted at its respective ends between a pair of arms indicated generally at 12—12. It will be noted that the respective ends of the roller 10 are flat and that the outer ends of arms 12—12 do not extend beyond a continuation of the curve of the roller as seen in profile in Figure 2. This is done so that the ends of the arms do not interfere with the rolling action of the roller. The outer end portions 13—13 of the respective arms are substantially parallel with one another. The journal pin 11 may be secured to the arms in these portions by swaging over the ends of the pin 11. It will be obvious however, that other means may be provided for journalling the roller 10 without departing from the spirit of the invention.

Arms 12 converge toward one another from the end portions 13 to meet as at 14 to form a shank 15 which is socketed in a handle 16. The shank portion may be riveted or otherwise secured to the handle. In the construction described above, the roller is the important element. The means for journalling the roller and the handle means shown are intended to be representative only of many which could be used.

Figure 1:
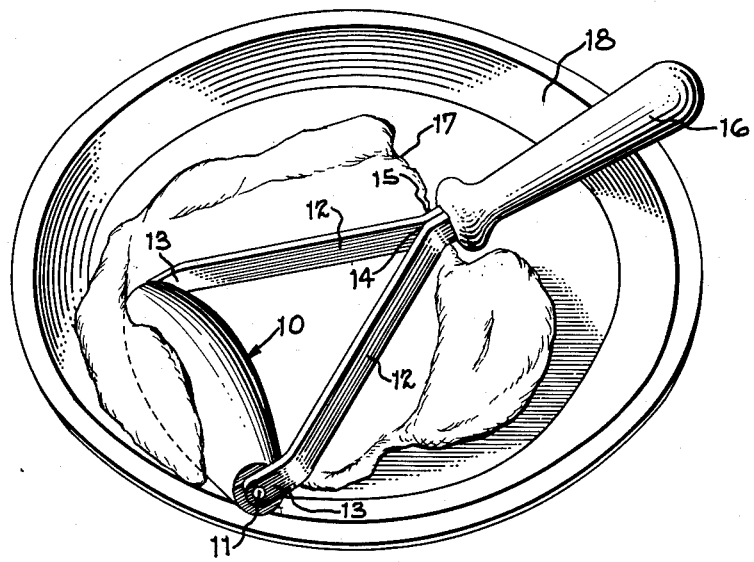
Figure 1 is a perspective view illustrating the roller of the present invention and the method of forming pie dough in a pie pan.

Referring now to Figure 1, to form a pie crust, a lump of pie dough indicated at 17 is placed in the bottom of a pie pan such as the one shown at 18. When using a prepared mix for the pie dough, best results are obtained if only enough water is added to bind the ingredients into a lump or ball. This may be done in a conventional mixing bowl. The lump of dough, after being placed in the bottom of the pan, is then rolled and worked by the roller, from the center outwardly toward the wall of the pan. Rolling is continued until a sheet of pie dough of desired thickness covers the side wall and bottom of the pan. Little care need be exercised in the rolling operation. The texture or smoothness of the raw dough is in no way indicative of the quality of the baked crust. For best results, the rolling should be continued no longer than is necessary to form the dough into the desired shape and thickness. A little practice will indicate the correct amount of mixed dough which should be used for a pan of a particular size so as to make trimming unnecessary.

Having described our invention, we claim:

1. The method of forming the lower crust of a pie comprising the steps of preparing a lump of pie dough of an appropriate size to form said lower crust, placing said lump in the center of the bottom of a pie pan providing a roller, spreading said lump of pie dough progressively radially outwardly from the center of said pan by means of said roller, said spreading continuing up the side wall of the pan to the rim thereof.

2. Means to form the lower crust of a pie, said means comprising the combination of a pie pan having a flat, circular bottom and an outwardly and upwardly flaring side wall, which is in the shape of a frustum of a cone, a roller which is generally in the shape of an elongated ellipsoid of revolution, and means to journal said roller to revolve about the longitudinal axis thereof, the longitudinal curvature of the roller conforming generally to the curvature of the side wall of said pie pan.

3. Means to form the lower crust of a pie, said means comprising the combination of a circular pie pan having a flat bottom and an outwardly flared side wall, said side wall being in the shape of a frustum of a cone, and a roller adapted to fit inside of said pan, said roller being generally in the shape of an ellipsoid of revolution with the longitudinal curvature of the roller conforming generally to the curvature of the wall of said pan.

4. Means to form the lower crust of a pie in a pie pan, said pie pan having a flat, circular bottom and an outwardly and upwardly flaring side wall which is substantially in the shape of a frustum of a cone, said means comprising a roller which is generally in the shape of an elongated ellipsoid of revolution the longitudinal curvature of which conforms generally to the curvature of the side wall of said pan, whereby a lump of dough placed in the bottom of the type of pan set forth may be spread substantially evenly by said roller over the bottom and side walls of the pan.

References Cited in the file of this patent

UNITED STATES PATENTS

| 903,584 | Kohler | Nov. 10, 1908 |
| 1,035,065 | Winder | Aug. 6, 1912 |
| 1,164,777 | Aschbacher | Dec. 21, 1915 |
| 1,323,410 | Sams | Dec. 2, 1919 |
| 1,628,828 | Denmead | May 17, 1927 |
| 1,871,754 | Smith | Aug. 16, 1932 |
| 2,099,286 | Usbeck | Nov. 16, 1937 |

FOREIGN PATENTS

| 110,678 | Austria | Sept. 25, 1928 |